US008849095B2

(12) United States Patent
Hoofien et al.

(10) Patent No.: US 8,849,095 B2
(45) Date of Patent: Sep. 30, 2014

(54) GOAL-BASED VIDEO DELIVERY SYSTEM

(75) Inventors: Nimrod Hoofien, Palo Alto, CA (US); Harry J. M. Robertson, Mountain View, CA (US); Caleb E. Spare, Sunnyvale, CA (US); Sean M. Knapp, Mountain View, CA (US)

(73) Assignee: Ooyala, Inc., Mountain View, CA (US)

( * ) Notice: Subject to any disclaimer, the term of this patent is extended or adjusted under 35 U.S.C. 154(b) by 0 days.

(21) Appl. No.: 13/190,714

(22) Filed: Jul. 26, 2011

(65) Prior Publication Data

US 2013/0028573 A1 Jan. 31, 2013

(51) Int. Cl.
| | |
|---|---|
| *H04N 9/80* | (2006.01) |
| *H04N 21/25* | (2011.01) |
| *H04N 21/2543* | (2011.01) |
| *H04N 17/00* | (2006.01) |
| *G06Q 30/02* | (2012.01) |
| *H04N 21/472* | (2011.01) |

(52) U.S. Cl.
CPC ........... *H04N 17/004* (2013.01); *H04N 21/251* (2013.01); *H04N 21/25435* (2013.01); *G06Q 30/0241* (2013.01); *H04N 21/47202* (2013.01)
USPC .............................. 386/248; 386/250; 725/14

(58) Field of Classification Search
USPC ......... 386/262, 278; 348/461; 725/14, 32–36, 725/46, 9
See application file for complete search history.

(56) References Cited

U.S. PATENT DOCUMENTS

| | | | |
|---|---|---|---|
| 6,847,778 B1 | 1/2005 | Vallone et al. | |
| 6,850,691 B1 | 2/2005 | Stam et al. | |
| 6,873,982 B1 * | 3/2005 | Bates et al. | 707/737 |
| 6,934,748 B1 * | 8/2005 | Louviere et al. | 709/224 |
| 7,441,260 B1 | 10/2008 | Kurapati | |
| 7,493,015 B1 | 2/2009 | Van Stam et al. | |
| 8,307,392 B2 * | 11/2012 | Ahanger et al. | 725/36 |
| 2002/0174429 A1 | 11/2002 | Gutta et al. | |
| 2003/0101451 A1 * | 5/2003 | Bentolila et al. | 725/34 |
| 2004/0093601 A1 * | 5/2004 | Master et al. | 718/102 |
| 2006/0026628 A1 * | 2/2006 | Wan et al. | 725/32 |
| 2006/0212904 A1 * | 9/2006 | Klarfeld et al. | 725/46 |
| 2009/0013347 A1 * | 1/2009 | Ahanger et al. | 725/36 |
| 2009/0100459 A1 * | 4/2009 | Riedl et al. | 725/35 |

(Continued)

OTHER PUBLICATIONS

Korean Patent Office, Office Action in application No. PCT/US2013/027162, dated Feb. 21, 2013, 10 pages.

(Continued)

*Primary Examiner* — Thai Tran
*Assistant Examiner* — Stephen Smith
(74) *Attorney, Agent, or Firm* — Hickman Palermo Truong Becker Bingham Wong LLP

(57) ABSTRACT

A system is provided that facilitates achieving a goal associated with a particular video asset. The system may provide an interface through which a user may specify control parameters that are to be the targets of testing, and a goal or combination of goals. The system may control a controller that performs experiments in an attempt to identify optimal values, relative to the specified goals, for the control parameters. The optimal values may be determined and tested on a per-individual-video asset basis. Further, the controller may generate multiple sets of optimal values for a given video, where each set is associated with a different combination of request attributes. To estimate the optimal parameter values for one video, the controller may use usage information collected for that video, as well as usage information collected for similar videos.

38 Claims, 13 Drawing Sheets

(56) References Cited

U.S. PATENT DOCUMENTS

| | | | |
|---|---|---|---|
| 2009/0193460 A1* | 7/2009 | Barnett | 725/38 |
| 2010/0122286 A1* | 5/2010 | Begeja et al. | 725/34 |
| 2010/0205625 A1* | 8/2010 | Beyabani et al. | 725/8 |
| 2010/0275226 A1* | 10/2010 | Kitazato | 725/32 |
| 2011/0016483 A1* | 1/2011 | Opdycke | 725/14 |
| 2011/0029996 A1* | 2/2011 | Le Foll et al. | 725/9 |
| 2011/0150427 A1* | 6/2011 | Kohno | 386/262 |
| 2011/0185384 A1* | 7/2011 | Wang et al. | 725/34 |
| 2012/0192226 A1* | 7/2012 | Zimmerman et al. | 725/34 |
| 2012/0216225 A1* | 8/2012 | Britt | 725/32 |
| 2012/0227064 A1* | 9/2012 | Neill | 725/14 |

OTHER PUBLICATIONS

Current Claims in application No. PCT/US2013/027162, dated Feb. 2013, 5 pages.

* cited by examiner

Experiment Selection [+ New]

Create multi-variate testing experiments for your video content.

| Name | Delete |
|---|---|
| Experiment 1 | ⊗ |
| Experiment 2 | ⊗ |
| Experiment 3 | ⊗ |
| Experiment 4 | ⊗ |
| Experiment 5 | ⊗ |
| Experiment 6 | ⊗ |

Reports | Multi-variate Testing

Experiment Type

Category [ Advertising ▼ ]

Experiment Filters

[x] Paywall    [ Paywall 1 ▼ ]
[ ] Ad Set
[ ] Geographic
[ ] Domain
[ ] Player
[ ] Device
[ ] Label
[ ] Embed Codes

Experiment Definition

*If content falls within the experiment filters, the following will display.*

Ad Set [ Ad Set 1 ▼ ]

Experiment Flight Times

*The experiment definition will be displayed based on the viewer's local time.*

Start Date [ 04/01/2011 ]
[ ] End Date [ 04/01/2011 ]
From [ 12:00 AM ] to [ 12:00 AM ] [ ] All day

FIG. 3C

Reports | Multi-variate Testing

Experiment Selection   [+ New]
Create multi-variate testing experiments for your video content.

| Name | Delete |
|---|---|
| Experiment 1 | ⊗ |
| Experiment 2 | ⊗ |
| Experiment 3 | ⊗ |
| Experiment 4 | ⊗ |
| Experiment 5 | ⊗ |
| Experiment 6 | ⊗ |

Experiment Type
Category [Advertising ▼]

Experiment Filters
- ☐ Paywall
- ☒ Ad Set  [Ad set 1 ▼]
- ☐ Geographic
- ☐ Domain
- ☐ Player
- ☐ Device
- ☐ Label
- ☐ Embed Codes

Experiment Definition
*If content falls within the experiment filters, the following will display.*
Ad Set [Ad Set 1 ▼]

Experiment Flight Times
*The experiment definition will be displayed based on the viewer's local time.*
Start Date [04/01/2011] 🗓
☐ End Date [04/01/2011] 🗓
From [12:00 AM] to [12:00 AM]  ☐ All day

FIG. 3D

Experiment Selection [+ New]
Create multi-variate testing experiments for your video content.

| Name | Delete |
|---|---|
| Experiment 1 | ⊗ |
| Experiment 2 | ⊗ |
| Experiment 3 | ⊗ |
| Experiment 4 | ⊗ |
| Experiment 5 | ⊗ |
| Experiment 6 | ⊗ |

Experiment Type
Category [ Advertising ▾ ]

Experiment Filters
- ☐ Paywall
- ☐ Ad Set
- ☒ Geographic
  - All users viewing content from ▾
  - [ x United States ] [ x Canada ]
  - [ Add Location ]
- ☐ Domain
- ☐ Player
- ☐ Device
- ☐ Label
- ☐ Embed Codes

Experiment Definition
If content falls within the experiment filters, the following will display.

Ad Set [ Ad Set 1 ▾ ]

Experiment Flight Times
The experiment definition will be displayed based on the viewer's local time.

Start Date [ 04/01/2011 ]

FIG. 3E

Experiment Selection

Create multi-variate testing experiments for your video content.

[+ New]

| Name | Delete |
|---|---|
| Experiment 1 | ⊗ |
| Experiment 2 | ⊗ |
| Experiment 3 | ⊗ |
| Experiment 4 | ⊗ |
| Experiment 5 | ⊗ |
| Experiment 6 | ⊗ |

Experiment Type

Category [ Advertising ▼ ]

Experiment Filters

☐ Paywall
☐ Ad Set
☐ Geographic
☒ Domain

[ All content embedded on the domains ▼ ]

[ x ooyala.com ] [ x google.com ]

[ Add Domain ]

☐ Player
☐ Device
☐ Label
☐ Embed Codes

Experiment Definition

*If content falls within the experiment filters, the following will display.*

Ad Set [ Ad Set 1 ▼ ]

Experiment Flight Times

*The experiment definition will be displayed based on the viewer's local time.*

Start date [ 04/01/2011 ] 📅

FIG. 3F

Experiment Selection

Create multi-variate testing experiments for your video content.

[ + New ]

| Name | Delete |
|---|---|
| Experiment 1 | ⊗ |
| Experiment 2 | ⊗ |
| Experiment 3 | ⊗ |
| Experiment 4 | ⊗ |
| Experiment 5 | ⊗ |
| Experiment 6 | ⊗ |

Experiment Type

Category [ Advertising ▼ ]

Experiment Filters

☐ Paywall
☐ Ad Set
☐ Geographic
☐ Domain
☒ Player [ Player 1 ▼ ]
☐ Device
☐ Label
☐ Embed Codes

Experiment Definition

If content falls within the experiment filters, the following will display.

Ad Set [ Ad Set 1 ▼ ]

Experiment Flight Times

The experiment definition will be displayed based on the viewer's local time.

Start Date [ 04/01/2011 ] 📅
☐ End Date [ 04/01/2011 ] 📅
From [ 12:00 AM ] to [ 12:00 AM ] ☐ All day

GOAL-BASED VIDEO DELIVERY SYSTEM

FIELD OF THE INVENTION

The present invention relates to delivering video assets over a network and, more specifically, to automatically adjusting control points associated with video assets to achieve specified goals.

BACKGROUND

It has become increasingly common for video assets to be delivered to users over a network. Movies, television shows, home videos, how-to videos, and music videos are merely a few examples of the types of video assets that are currently provided over the Internet, telephone networks, intranets, cable connections, etc. Video assets that are obtained over a network can be played as the video assets are being delivered (streamed), or after the entire video assets have been downloaded.

Regardless of how the users play the video assets, the creators of video assets have typically created the video assets with a particular goal in mind. In many cases, the goal is simply to make money. This may be the goal, for example, for the creators of a television sitcom. In other cases, the goal may be to promote an idea. When the goal is promoting an idea, the creators may be less concerned about the revenue the video produces, but vitally concerned about how many distinct users view the video in its entirety. Promoting an idea may be the goal, for example, of a video that conveys a political or religious message.

While goals are easy to identify, it is difficult to know how to best achieve them. For example, the creator of a particular video may use trial and error in an attempt to maximize revenue. Specifically, the creators may allow the users to view a certain amount of video for free prior to paying to watch the entire video. The point within the video at which the free viewing ends is referred to as the "paywall", and the period between the beginning of the video and the location of the paywall is referred to as the "free preview window". To determine the effect that different paywall locations have on revenue, during a first testing period the creator may set the free preview window to be one minute. After the first testing period, the creator may have a second testing period during which the video is provided with a five minute free preview window. After the second testing period, the video creator may compare the percentage of users that paid to view the video during the two testing periods to decide which paywall location will result in higher revenue. Based on the result, the video creator may maintain the paywall location, revert to the old paywall location, or try yet another paywall location.

Trial and error tests may be run sequentially, as described in the previous example, or concurrently. As an example of concurrent testing, during the same testing period the same video may be provided to some users with a one minute paywall, and to other users with a five minute paywall. Unfortunately, whether performed sequentially or concurrently, using trial and error in an attempt to achieve a particular video delivery goal is very labor-intensive and can lead to significant inefficiencies. For example, it may turn out that both tested paywalls were significantly shorter than optimal, but that changing the paywall now will not bring back the lost viewers that started watching the video but decided to not continue due to the short paywalls that were tested.

Trial and error can also lead to inefficient results because the video creator failed to identify and adjust a parameter that would have had a significant effect on achieving the goal. For example, it may be that the duration of the paywall for viewing the video asset has less effect on revenue the layout of the video player. By focusing exclusively on testing paywall durations, the video creator may have missed out on a significant revenue increase that would have resulted from changing the layout of the video player.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 3A-3J are block diagrams of an interface through which users may specify goals and target control parameters for experiments related to a particular video asset.

DETAILED DESCRIPTION

Figure 1:
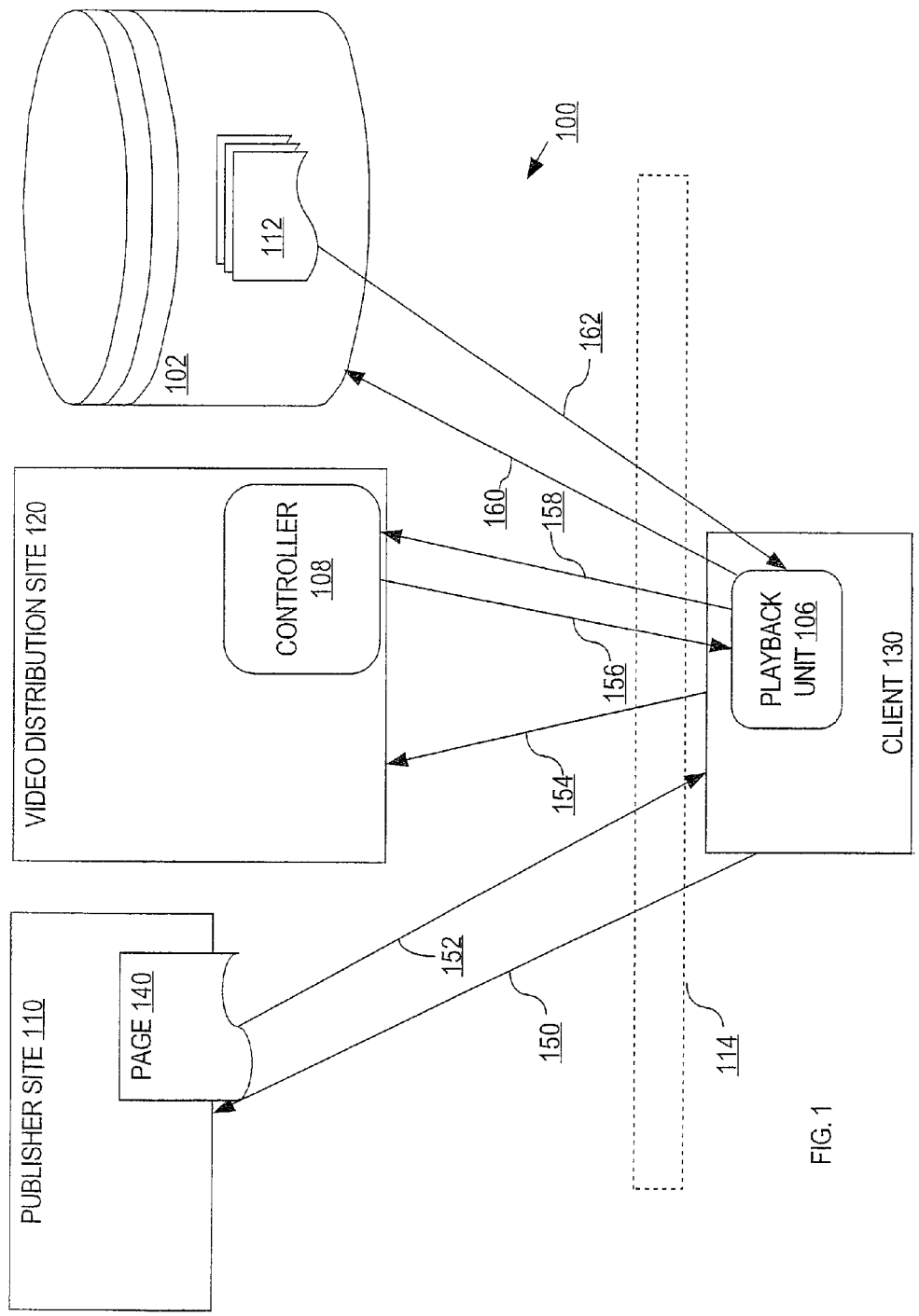
FIG. 1 is a block diagram of a video distribution system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system is provided that facilitates achieving a goal associated with a particular video asset. In one embodiment, the system provides an interface through which the owner of a video asset may specify (a) control parameters that are to be the targets of testing (the "target control parameters"), and (b) a goal or combination of goals. The goal or combination of goals specified by the user correspond to a "goal metric" that provides an objective measure of the degree of success at achieving the goal specified by the video asset owner. Typically, the goal metric is derived from one or more feedback parameters. The feedback parameters from which the goal metric is derived are referred to herein as the "goal parameters".

For example, the owner of a television show may specify the target control parameters to be "paywall-duration", "number-of-advertisements", and "price", and the goal to be "maximize revenue". The goal metric for "maximize revenue" may be derived from the prices that are paid by viewers, and number of views at each of the prices. Once the target control parameters and goal metric have been specified, the system automatically performs tests during which the target control parameters are adjusted based on how the target control parameters are affecting the goal metric.

In an alternative embodiment, users of the system specify only the goal itself, and the system performs a first round of tests to determine which control parameters have the greatest effect on the goal metric. After the first round of tests, a second round of tests are performed in which values of the control parameters that have the least effect on the goal metric are fixed, and values of the control parameters that have greatest effect on the goal metric are varied to discover the optimal values that maximize the goal metric.

Control Parameters

Video assets can have any number of control parameters that affect how and when the video assets are delivered to viewers. Such control parameters, may include but are not limited to parameters that control:

- The time of day the video asset may be delivered
- The free preview duration
- The price for viewing the video asset
- How many advertisements are inserted into the video asset during playback
- The clustering of advertisements that are inserted into the video asset during playback (e.g. three in a row, or only one advertisement per break)
- Location of advertisement sets to use with the video asset (e.g. whether the advertisements are pre-roll, mid-roll, or post-roll)
- Types of advertisements (e.g. companion advertisements) to use with video asset
- Which advertisement network(s) is/are to supply advertisements that will accompany the asset
- The frequency at which advertisements are played during playback of the video asset
- The layout or operation of the playback unit
- The mechanism by which users enter and/or are presented with video recommendations
- The keyword or hints sent to the ad server serving advertising to the page or video
- The type of subscription or entitlement required to allow playing the video
- Selecting the type of monetization strategy for the video (advertising vs. paywall vs. subscription)

The control parameters enumerated above are merely some of the many types of control parameters that may be associated with any given video asset. Any one of these parameters may have an affect on the degree of success in achieving the goal of the owner of the video asset.

As mentioned above, a target control parameter is a control parameter that is to be the target of testing. Consequently, during automated testing, values of target control parameters are manipulated by a controller in an effort to achieve the specified goal. Control parameters whose values are not determined by a controller are referred to herein as "fixed control parameters".

In any given situation, some target control parameters may have a significantly greater effect than others on achieving a specified goal. However, the target control parameters that have the greatest effect on achieving goals may vary from video asset to video asset, and from goal to goal. For example, changing the number-of-advertisements value may have little effect on how many viewers watch one video asset (e.g. a children's show), but a large effect on how many viewers watch another video asset (e.g. a newscast). Similarly, given the same video, the number-of-advertisements value may have a small effect on one goal (e.g. maximizing the number of distinct viewers), but a large effect on another goal (e.g. maximizing advertising revenue).

Video Asset Delivery System

Referring to FIG. 1, it is a block diagram of a system 100 that is configured to optimize target control parameters based on goal metrics while delivering video assets to viewers over a network 110. System 100 includes video asset storage 102, a publisher site 110, a video distribution site 120, and a controller 108. In the illustrated embodiment, controller 108 is maintained at video distribution site 120. However, in alternative embodiments, controller 108 may be located at other sites, reside at the client 130, be distributed over many sites, or be distributed between the video distribution site 120 and clients.

Publisher site 110 generally represents any number of publisher sites and/or services from which users may request pages for viewing video. For the purpose of explanation, it shall be assumed that client 130 requests a page 140 from publisher site 110, where page 140 is a page for viewing a particular video asset 112 stored at video asset storage 102.

Video asset storage 102 generally represents one or more sources at which the video assets are persistently stored. Thus, video asset storage 102 may be storage controlled by the party that manages video distribution site 120, or may be storage at one or more sites, managed by other parties, to which video distribution site 120 and/or client 130 have access. The video distribution techniques described herein are not limited to any particular type, source, or storage arrangement of the video assets. In fact, the video distribution techniques described herein may be used even when there is no persistently stored video asset. For example, the techniques may be used with live streaming video, where video data is distributed, as the video data is generated, from a source that is generating the video data.

In response to the request 150 for page 140, publisher site 110 sends to client 130 through network 114 a response 152 that includes page 140. According to one embodiment, page 140 does not contain video asset 112 itself, but rather code (such as JavaScript) which, when executed by client 130, causes client 130 to send a request 154 to video distribution site 120.

In response to the request 154 from client 130, video distribution site 120 sends code that implements a playback unit 106 to client 130. When executed on client 130, the playback unit 106 sends (a) a request 158 to video distribution site 120 for parameter values, and (b) a request 160 to storage 102 for video asset 112.

In response to the request 158 for parameter values, the controller 108 employed by video distribution site 120 sends a response 156 that contains parameter values to be used by playback unit 106 during playback of the requested video asset 112. The parameter values sent by controller 108 include values for one or more target control parameters. In addition, the parameter values provided by controller 108 may include values for one or more fixed control parameters.

After receiving the control parameter values from controller 108 and the video asset 112 from storage 102, playback unit 106 proceeds to play the video asset 112 based on the control parameter values.

In the embodiment illustrated in FIG. 1, the code for playback unit 106 is provided by video distribution site 120. However, in alternative embodiments, playback unit 106 may be provided by the publisher site 110, may be a locally-installed program on client 130, or may be a playback unit provided over network 114 from a third-party source. The techniques described herein are not limited to any particular source for the code that implements playback unit 106. Any playback unit 106 that operates based on the control parameter values selected by controller 108 may be used.

Selection of Control Parameter Values

According to one embodiment, controller 108 determines values for the control parameters on a per-playback-operation-per-video-asset basis based on a variety of factors. The factors that affect the control parameter values selected by the controller 108 may include, by way of example and not by way of limitation, any combination of:

metadata associated with the video asset previously obtained test information related to the requested video asset previously obtained test information related to similar requested video assets information related to the current requestor information related to the current playback environment Each of these factors, and how they may be used by controller 108 to select the control parameter values, shall be described in greater detail hereafter.

Metadata Associated with Video Assets

Various types of metadata may be associated with video assets. Such metadata may be embedded in the video files themselves, or may be maintained separate from the video files. Examples of metadata that may be associated with video assets include, but are not limited to:

subscription settings that indicate who is allowed to view the asset the resolution of the video the length of the video the publisher of the video actors in the video an audience rating of the video constraints associated with when or to whom the video may be shown a price or price range for the video keywords or tags that reflect the contents of the video a category into which the video has been assigned a minimum and/or maximum number-of-advertisements that can be inserted into the video an indication of points, within the video, into which advertisements may be inserted which control parameters are to be used as target control parameters during playback of the video asset constraints associated with the target control parameters (e.g. that the "paywall-duration" cannot exceed 5 minutes)

which control parameters are fixed the parameter values that are to be used for each of the fixed control parameters the goal parameters by which to calculate the goal metric for the video asset relative weights for each of the goal parameters These are merely a few examples of metadata that may be associated with a video asset. The types of metadata that may associated with a video asset is virtually limitless, and the techniques described herein are not limited to any particular type or combination of types of video asset metadata.

Usage Results for the Requested Asset

As shall be described in greater detail hereafter, information about how users interact while viewing a video asset is collected and compiled. The information that has been compiled based on prior viewings of a particular video asset is used by controller 108 to adjust the target control parameters in an attempt to maximize the goal metric. Such previously-acquired information may include, for example, the control parameter values that were used in each prior viewing of the video asset, and for each combination of control parameter values:

the number of viewings initiated the ratio of viewings initiated to viewings completed the ratio of viewings initiated to viewings paid for the time period(s) during which that particular combination of control parameter values was being used by controller 108 for the video asset the average and/or median viewing duration when the viewing was not completed how frequently users paused, skipped, rewound and/or fast forwarded the viewing the duration and location of pauses, skips, rewind operations and fast forward operations the times of day or days of the week in which the viewings occurred demographic information about the viewers each user's interaction with the playback unit, and the point within the video asset that the interaction occurred The URLs the videos were played on The URLs of the pages referring the page where the video is played from These are merely examples of the types of information that may be collected as viewers view video assets managed by video distribution site 120. The techniques described herein are not limited to any particular type of usage information.

Usage Results for Similar Assets

It is possible that little or no usage results will be available for a requested video asset. This may be the case, for example, when a video asset has just been made available for viewing. It may also be the case for video assets that are viewed very infrequently.

When little or no usage results are available for a requested video asset, controller 108 may select target parameter values based, at least in part, on usage results for assets that are deemed similar to the requested video asset. A variety of techniques may be used to determine which video assets are "similar" to each other. For example, similarity between video assets may be based, at least in part, on similarity between the metadata associated with the video assets. Thus, two video assets that have 90% of their respective metadata tags in common would be deemed highly similar, while two video assets that have no metadata tags in common would be deemed highly dissimilar. Similarly, video assets from the same category, or from the same producer, may be deemed similar.

Another factor that may be used to determine which video assets are similar to each other is the "channel" to which the video assets are assigned. In one embodiment, media managers assign similar types of video assets to the same channel (e.g. a "world news" channel, a "sports" channel, etc.). Video assets that have been assigned to the same channel may be deemed to have a high degree of similarity, even when the metadata associated with the assets is not particularly similar. The channel to which a particular video is assigned may be determined manually by a media manager, or automatically based, for example, on metadata tags that have been assigned to the videos, either by the creators of the video assets, the managers of the channels, or end user viewers of the videos.

Instead of or in addition to using video asset metadata to determine similarity, similarity may be determined based, at least in part, on which viewers have viewed the video assets. For example, if 90% of the viewers of one video asset have also viewed another video asset, then the two video assets may be deemed similar. On the other hand, if two video assets been viewed by viewers with markedly different demographics, then the two video assets may be deemed highly dissimilar.

As mentioned above, controller 108 may take into account the usage results of similar videos when selecting the target parameter values of a requested video asset that has little usage results of its own. However, it may also be beneficial for controller 108 to use the usage results of similar assets even when a significant amount of usage results are available for the requested video asset itself.

Requestor Information

As mentioned above, controller 108 may base its selection of target parameter values, at least in part, on information about the user that is requesting to view the video asset. Controller 108 may obtain information about the viewer in a variety of ways. For example, a browser on client 130 may send video distribution site 120 cookie information along with message 154. As another example, playback unit 106 may be configured to operate only after the requesting user has been registered with the video distribution site 120, where the registration process involves providing demographic information about the user. While there are various mechanisms by which controller 108 may obtain information about the requesting user, the techniques described herein are not limited to any particular way of obtaining requestor information, nor any particular type of requestor information.

According to one embodiment, controller 108 may compare the current requestor's information with requestor information stored with the usage results of the requested video asset in order to better predict the results of using particular target parameter values. For example, the usage results for a particular video V may indicate that viewers under the age of 20 viewed the entire video V 20% of the time when the video V was presented with five advertisements, and 80% of the time when the video V was presented with two advertisements. On the other hand, viewers over the age of 20 may have viewed the entire video V 80% of the time regardless of whether the video V had five or two advertisements. Under these circumstances, if a goal of the creators of video V is to maximize the number of people that view the entire video, then controller 108 may select "5" as the "number-of-advertisements" parameter value for video V when the requestor is over 20, and "2" as the "number-of-advertisements" parameter value for video V when the requestor is under 20.

Playback Environment Information

The playback environment of a video asset may affect which target parameter values are optimal for any given playback of the video asset. The playback environment information that controller 108 takes into account when selecting the target parameter values may include, for example:

- the time of day during which the playback request is received
- the amount of traffic on the network during which playback occurs
- the hardware and/or software platform of the device on which playback occurs
- the ISP through which the viewer is accessing the network
- the brand or version of browser and/or other software used by the client 130
- whether playback is occurring in a business, home, or academic environment
- the layout of the playback unit
- the manner in which user recommendations of videos are entered and/or presented These are merely examples of the types of environment information that may be used by controller 108 in its selection of target parameter values to be used during the playback of a requested video asset. For example, if the usage results for the requested asset show that people that use a particular brand of browser are less sensitive to advertisements, controller 108 may select a higher value for the "number-of-advertisements" parameter if the playback environment for the request includes that particular brand of browser, and a lower value for the "number-of-advertisements" parameter if the playback environment for the request includes a different brand of browser.

Goal Selection

As mentioned above, different asset creators may have different goals. For example, the goals of a video asset creator may include one or more of the following:

- maximizing the percentage of viewers that commit to pay at a paywall
- maximizing the number of user that start watching the video
- maximizing the number of users that finish watching the video
- maximizing the rate at which new users join a video service
- minimizing the rate at which current users cancel subscriptions
- maximizing the feedback rating of the video
- maximizing the feedback rating of a video service
- maximizing the number of users that leave feedback relating to the service
- maximizing advertisement revenue
- maximizing geographic dissemination of the video
- maximizing demographic dissemination of the video
- maximizing some user action outside the video, such as making purchases for items on the page
- any combination of the above These are merely a small list of the virtually limitless types of goals the creator of a video asset may have. Further, the goals of an asset creator may change over time. Thus, while a video creator may initially be interested in revenue to recoup the cost of creating the video, after the cost has been recouped, the creator may become more interested in dissemination than in additional revenue.

User selection of a goal, or a weighted combination of several goals, implicitly selects the feedback parameters that will reflect the degree to which the goal is being satisfied. For example, if the goal is to maximize the number of users that start watching a video, then the relevant feedback parameters may be the number of distinct IP addresses from which requests for playing the video were received. On the other hand, if the goal is to maximize advertisement revenue, then the number of distinct requestor IP addresses may be irrelevant. Instead, the number-of-advertisements shown or clicked would be the relevant feedback parameters.

Controller Operation

Figure 2:
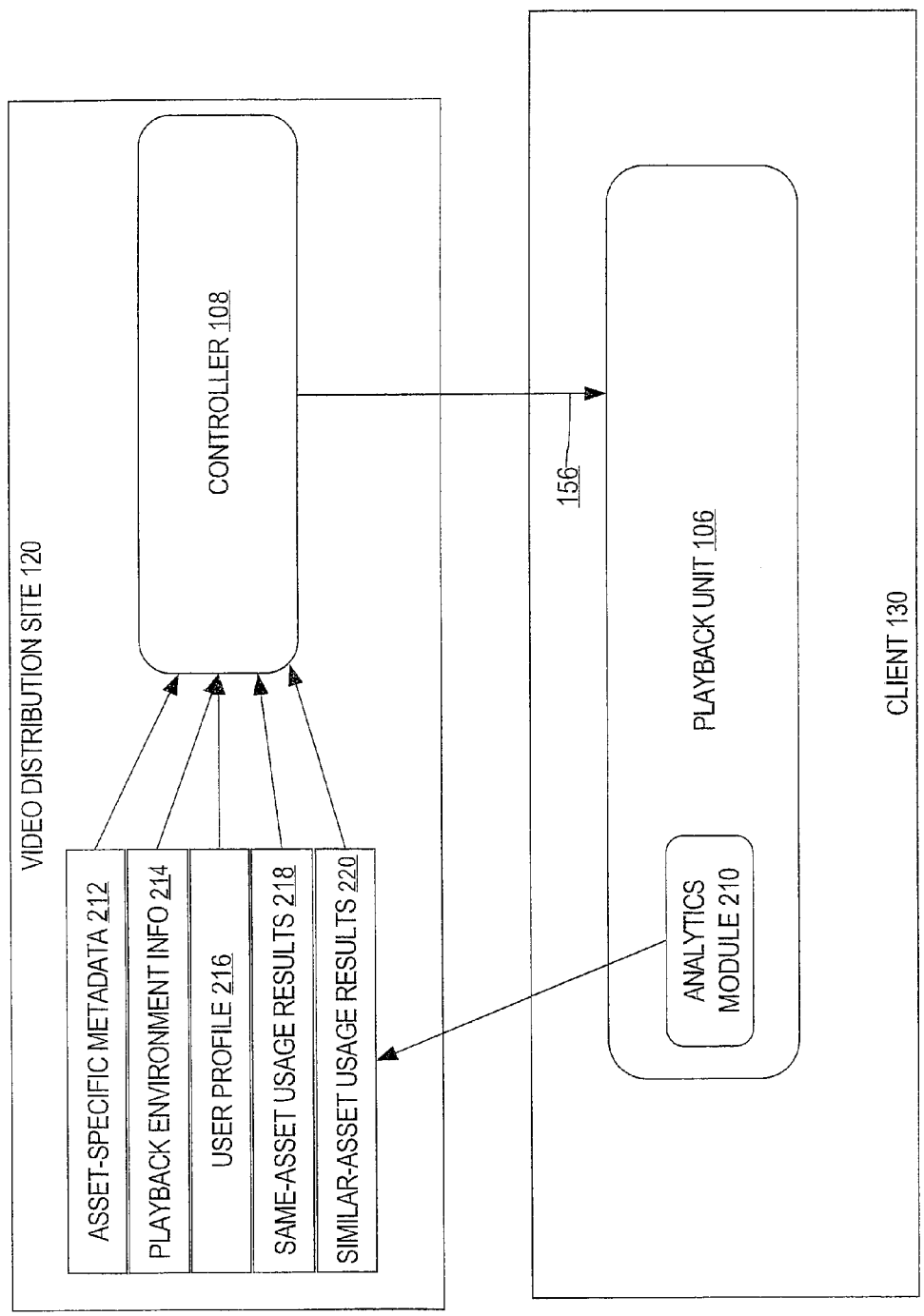
FIG. 2 is a block diagram that illustrates the video distribution site of FIG. 1 in greater detail.

Referring to FIG. 2, it illustrates video distribution site 120 and client 130 in greater detail, according to an embodiment of the invention. Specifically, video distribution site 120 stores various types of information used by controller 108 to determine target control parameter values to send to playback unit 106 to govern playback of a particular video asset. In the illustrated embodiment, video distribution site 120 maintains asset-specific metadata 212, playback environment information 214, user profile information 216, same-asset usage results 218, and similar-asset usage results 220.

In response to each video asset playback request, controller 108 selects the control parameter values to provide to playback unit 106 based on one or more of the asset-specific metadata 212, playback environment information 214, user profile information 216, same-asset usage results 218, and similar-asset usage results 220. The control parameter values provided to playback unit 106 may include both fixed parameter values, and target parameter values.

In one embodiment, controller 108 determines which control parameters qualify as target control parameters for any given video asset request based on asset-specific metadata 212 associated with the video asset that has been requested. For example, the asset-specific metadata for video V may indicate that "paywall-duration" and "price" are target parameters, while "number-of-advertisements" and "times-available" are fixed parameters, with the values "2" and "6 pm to 8 pm", respectively.

Gathering Usage Data

As mentioned above, controller 108 determines an optimal combination of target parameter values based, at least in part, on usage results. The usage results may include both same-asset usage results 218, and similar-asset usage results 220. However, before controller 108 may take usage information into account when selecting target parameter values, controller 108 must first obtain the usage information.

Controller 108 may obtain usage information in a variety of ways. For example, software on client 130 may be configured to monitor user interaction that occurs during the playback of a video asset. In the embodiment illustrated in FIG. 2, the monitoring is performed by an analytics module 210 that is part of playback unit 106. However, in alternative embodiments, the monitoring can be performed by software external to the playback unit 106 itself, or by a plug-in to the playback unit 106.

Analytics module 210 gathers the type of information needed to evaluate the goal metric. The specific type of information gathered by analytics module 210 may vary based on the types of goals that are supported by controller 108. For example, analytics module 210 may gather information about one or more of:
- whether the user paid to pass the paywall
- whether the user played the video to the end
- at which point(s) the user paused the video
- which advertisements the user clicked on
- which advertisements the user hovered over
- what platform the user was using
- the local time at which the user performed the playback operation
- the layout of the playback unit
- the rating the user gave to the video
- whether the user shared the video with others These are merely examples of the virtually unlimited types of actions that may be monitored and recorded by analytics module 210. This information about the user's actions during a playback operation is correlated with information about what control parameter values were in effect during the playback operation, in order for controller 108 to determine the effect that different parameter values have on the user's actions.

Facilitating the Selection of Goals and Target Control Parameters

According to one embodiment, a video asset delivery system is provided that includes an interface that facilitates the specification of goals, and the selection of target control parameters for a video asset. The interface may be implemented, by way of example and not by way of limitation, as illustrated in FIGS. 3A-3J.

Figure 3A:
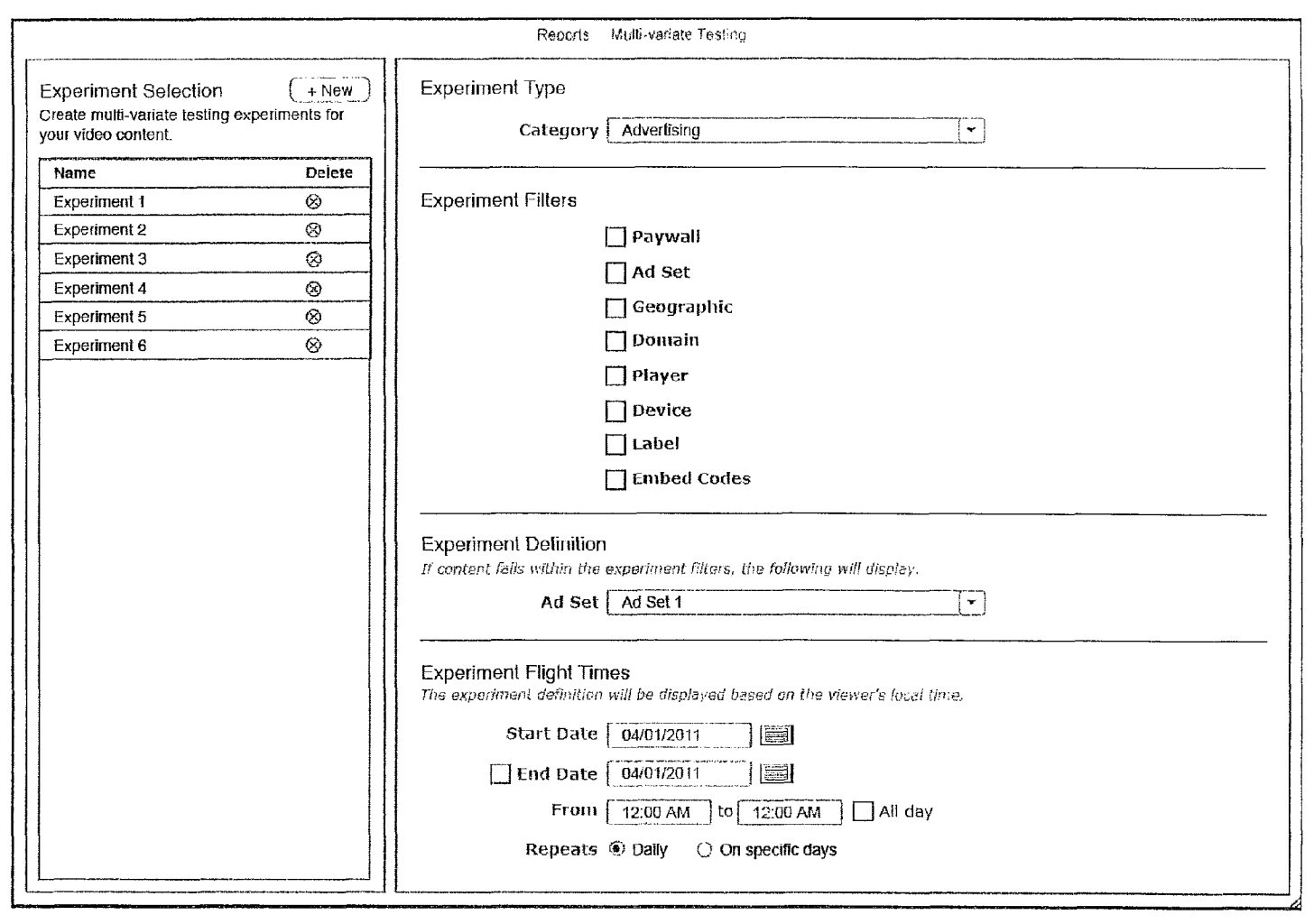
Figure 3B:
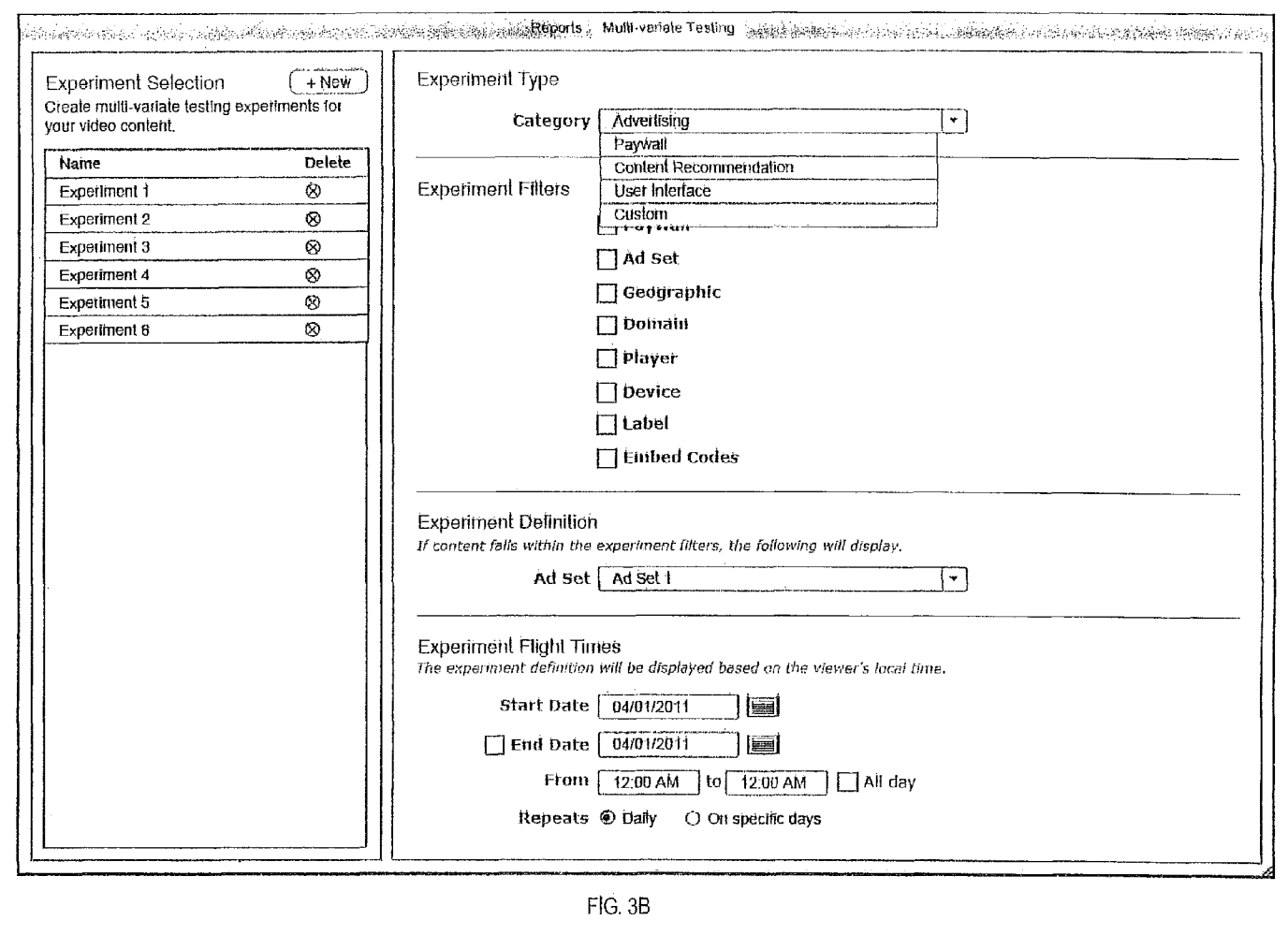

Specifically, referring to FIG. 3A, it illustrates user interface for setting up and managing experiments. FIG. 3B illustrates how, in setting up a new experiment, a user may select an experiment category. Various experiment categories can be supported. In the illustrated embodiment, the experiment categories are Advertising, Paywall, Content Recommendation, User Interface, and Custom. However, the system and techniques described herein are not limited to any particular experiment categories.

Figure 3H:
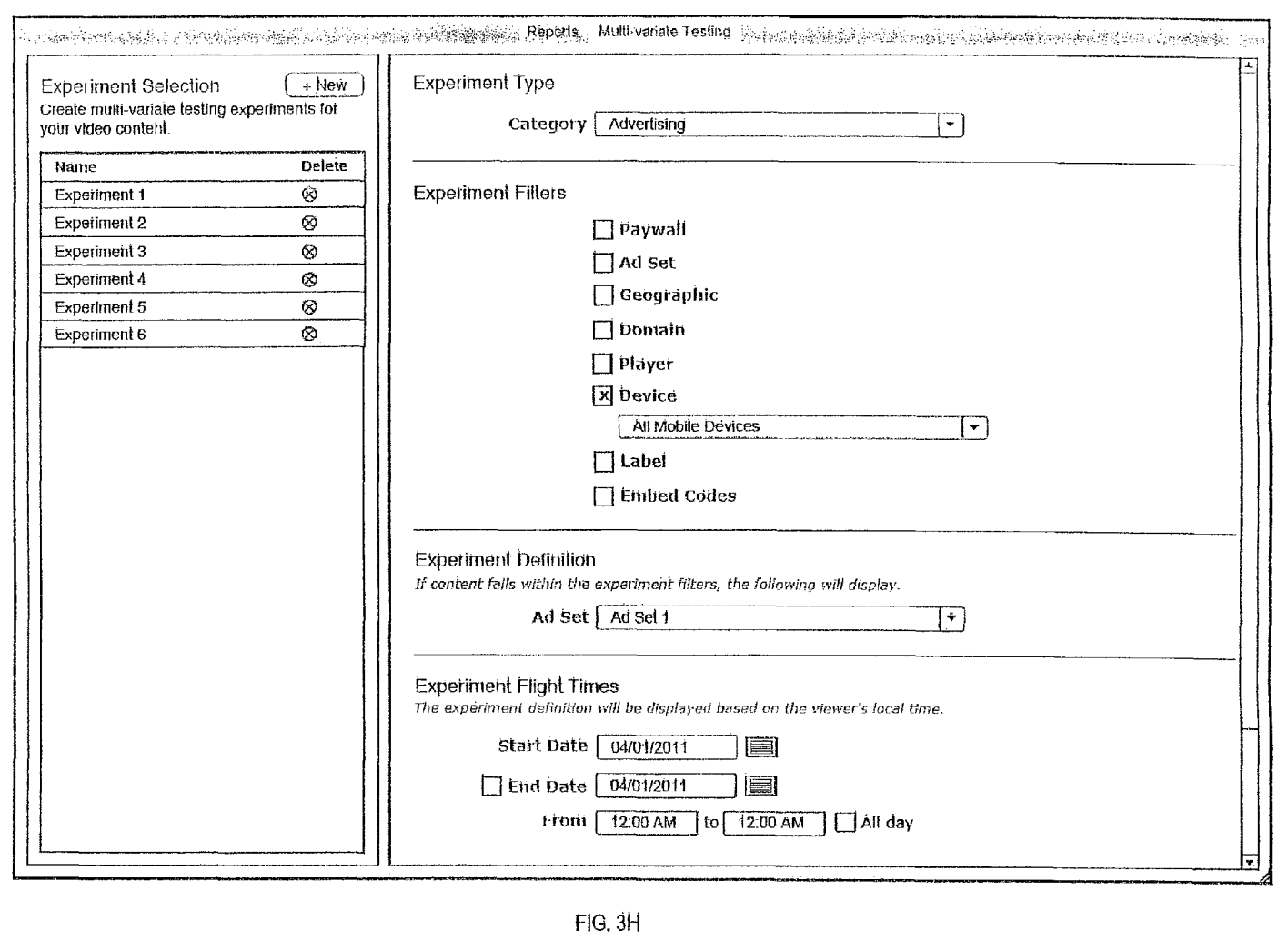
Figure 3I:
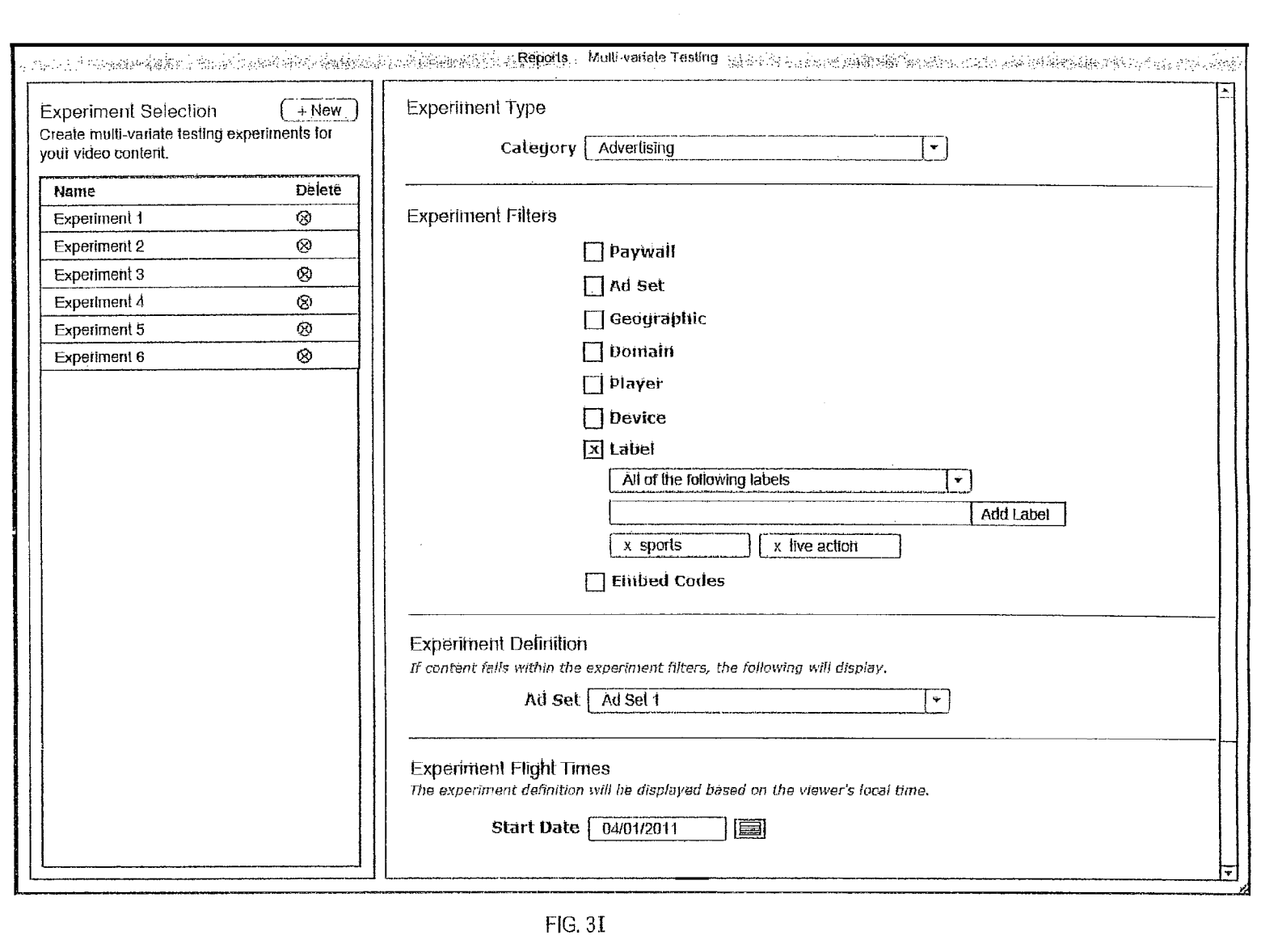
Figure 3J:
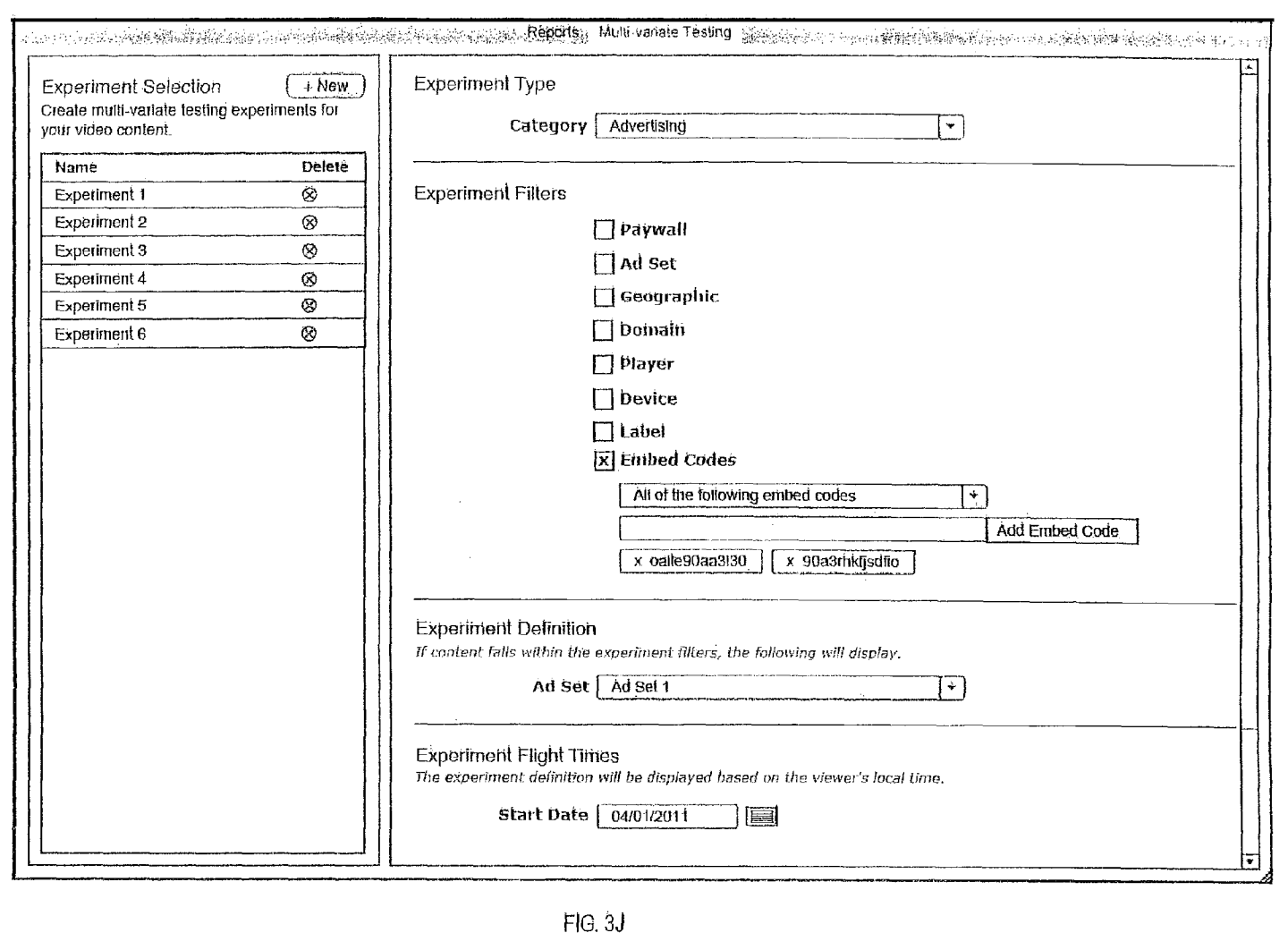

FIG. 3C is a block diagram of the interface illustrated in FIG. 3B, where a user has selected to apply an experiment only to assets using a particular paywall. FIG. 3D is a block diagram of the interface illustrated in FIG. 3B, where a user has selected to apply an experiment only to assets using a particular ad set (ad configuration). FIG. 3E is a block diagram of the interface illustrated in FIG. 3B, where a user has selected to apply an experiment only to assets using a particular geography/location. FIG. 3F is a block diagram of the interface illustrated in FIG. 3B, where a user has selected to apply an experiment only to assets served from a particular domain. FIG. 3G is a block diagram of the interface illustrated in FIG. 3B, where a user has selected to apply applying an experiment only to assets using a particular player configuration. FIG. 3H is a block diagram of the interface illustrated in FIG. 3B, where a user has selected to apply an experiment only to assets served to a particular device (mobile/web/set top box, etc.) FIG. 3I is a block diagram of the interface illustrated in FIG. 3B, where a user has selected to apply an experiment only to assets with a particular label. FIG. 3J is a block diagram of the interface illustrated in FIG. 3B, where a user has selected to apply an experiment only to specific assets (identified by an embed code).

In addition to specifying the filters that determine which assets an experiment is applied to, the interface illustrated in FIGS. 3A-3J includes or may include controls for:
- listing and selecting previously defined experiments,
- adding newly defined experiments to the list
- the times (dates, times of day, etc.) during which an experiment is active
- what action to perform when providing a video asset that falls within the specified filter criteria These are merely examples of controls provided by an interface of a system designed to automatically perform experiments to see the effects of changing parameters that affect the playback of video assets.

Optimizing the Target Control Parameters

When a new video asset is made available for presentation, little or no same-asset usage results will be available for the video asset. Consequently, for the first several requests for the video asset, the controller 108 may simply send a set of "default" values for the target parameters. Such default parameters may be site-wide defaults, defaults for the particular category of video, or defaults for the particular creator of the asset. Alternatively, the asset-specific metadata 212 may specify the default values from which testing is to begin.

As the number of requests for the video asset increases, the amount of same-asset usage results 218 will increase. To determine the effect of changing the target parameter values, controller 108 may begin to vary the target parameter values. Initially, the degree of variation used by controller 108 will be greater, because the initial control parameter values are based on minimal feedback data, and therefore are less likely to be optimal. As the analytics module 210 continues to provide feedback based on the a greater number of viewings and a wider range of target parameter values, controller 108 may adjust the parameter values up or down based on which direction of adjustment is likely to increase the goal metric. In addition, as the amount of collected usage information increases, the degree to which the target parameter values are allowed to vary from the current optimal values may decrease.

For example, assume that the goal of the creator of a video is to maximize the number of advertisement views. Further assume that "number-of-advertisements" is the only target control parameter. Under these circumstances, controller 108 may start out using the default value of 8 advertisements, and periodically vary the value between 4 and 12. After collecting sufficient same-asset usage results 218, controller 108 may determine that 10 seems to be the optimal number-of-advertisements (e.g. more than 10 and people stop watching the video). Based on this information, controller 108 may use 10 for the "number-of-advertisements parameter".

However, even after having selected 10 as the current optimal value for "number-of-advertisements", controller 108 may still periodically vary the value between 9 and 11. By continuing to accumulate data that indicates the effect of increasing or decreasing the value, controller 108 is able to detect and respond to situations where the optimal parameter value for a particular target parameter changes over time. Thus, the range within which controller 108 varies the target control parameters decreases over time (due to the increased degree of confidence about what parameter value is currently optimal). However, even when the degree of confidence in the currently optimal value is very high, some variation is still performed to detect and adjust for gradual changes in what values are optimal.

Situation-Specific Optimal Values

According to one embodiment, numerous situation-specific current optimal values may be maintained for each target control parameter for each asset. For example, the optimal "number-of-advertisements" for a given video may be 3 for female viewers, and 4 for male viewers. In this example, controller 108 would inspect the user profile 216 of a user requesting the video to determine the gender of the requestor, and then select a target parameter value based on the current optimal value for a requestor of that gender.

In the above-example, requests would be treated differently by controller 108 based on the gender of the requestor. However, attributes of the requestor are merely one way in which requests are situation-specific. The greater the number of attributes used by controller 108 to differentiate between situations, the greater the number of current optimal value combinations controller 108 maintains for a given video. For example, if requests are characterized by (a) age of requestor, (b) gender of requestor, (c) group(s) to which the requestor belongs, (d) platform used by the requestor, (e) time of day, (f) geographic location of requestor, and (g) past viewing history of requestor, controller 108 may concurrently maintain thousands of current optimal value combinations for the same video.

Controller 108 uses information such as the user profile 216 and playback environment information 214 to determine the attributes of the current request, identifies the current optimal value of each target control value for that particular combination of request attributes, and then selects the actual control parameter values to send to the playback unit 106 based on those current optimal values for that combination of request attributes.

Intelligent Initial-Value Selection

When a video asset is first added to storage 102, no same-asset usage results 218 would be available to controller 108 for that video asset. According to one embodiment, under these circumstances, controller 108 may randomly select target parameter values, or randomly select target parameter values within some constrained range. However, such random selection may result in the use of values that are so far from optimal that use of the values significantly harms the interests of the asset provider, the viewers, or both. For example, if controller randomly chooses to insert 20 advertisements in a new video asset that is only five minutes long, it is unlikely that any viewer will finish viewing the asset.

According to one embodiment, controller 108 increases the likelihood that even the first target parameter values are close to optimal by taking into account similar-asset usage results 220. As mentioned above, any number of factors may be used to determine which existing video assets are similar to a new video asset. For example, similarity may be based on duration, source, target audience, genre, actors, rating, matching asset metadata, etc.

In one embodiment, similar-asset usage results 220 include the current optimal parameter values of assets that are similar to the new asset. For example, similar-asset usage results may store the current optimal parameter values for hundreds of videos that are similar to the new video asset. Based on those optimal parameter values, controller 108 may generate initial optimal target parameter values for the new asset. For example, based on the fact that the optimal number-of-advertisements for ten already-existing 5-minute-long videos is 2, and for eleven other already-existing 5-minute-long videos is 3, controller 108 may determine that the initial optimal number-of-advertisements for a new 5-minute-long video is 3, or should be constrained to a range between 1 and 4.

In one embodiment, the degree of similarity between each existing video and a new video affects how much effect the existing video's optimal parameter values affect the initial optimal parameters of the new video. For example, if 10 existing videos have a 90% similarity to a new video and have "optimal number-of-advertisements=4", while 11 existing videos have a 50% similarity to the new video and have "optimal number-of-advertisements=3", then the initial optimal value selected by controller 108 for the new video would be 4, rather than 3.

In one embodiment, the assets that are similar to a new asset are identified based, at least in part, on similarity between how the new asset starts to performed and how other assets started to performed when they were new. For example, if after delivering a new video 100 times, the same-asset usage results obtained during those 100 playback operations may be compared with usage results of other assets after their first 100 viewings. Those other video assets whose early usage results closely match the new assets early usage results may be considered "similar". Consequently, the current optimal values for the new asset may be adjusted to be closer to the current optimal values for those similar assets.

Optimizing the Goal Metrics

The current optimal parameter values for a given asset are only "optimal" relative to the goal metric that those parameter values optimize. For example, if the goal is to maximize revenue, then the goal metric could be (number of advertisement views)×(revenue per advertisement view). The parameter values that would optimize that goal metric would be very different than the parameter values that would optimize the goal metric of "number of distinct users that view the entire video".

According to one embodiment, the goal metric for a given video may be derived by assigning relative weights to constituent goal metrics. For example, an asset owner may specify that the goal metric for one video is 80% "number of distinct viewers" and 20% "advertisement revenue". Under these circumstances, controller 108 would try to determine the optimal values for each of the constituent goal metrics. Once the separate optimal values are known for each of the constituent goal metrics, controller would determine the optimal values for the overall goal metric based on the weights assigned to the respective constituent goal metrics.

For example, assume that the optimal number-of-advertisements for advertising revenue is 10, and the optimal number-of-advertisements to maximize the distinct number of viewers is 0. Under these circumstances, since the asset owner has weighted the "number of distinct viewers" goal higher than the "advertisement revenue" goal, controller 108 would determine the optimal number-of-advertisements to be closer to 0 than to 10. For example, controller 108 could determine that the optimal number-of-advertisements is 2, which maximizes neither of the constituent goal metrics, but may be optimal from the asset owner's perspective.

According to one embodiment, once the asset owner has specified the goal for a particular asset, controller 108 uses multivariate testing to determine the optimal target parameter value combination for the goal metric. Various techniques may be used by controller 108 during performance of the multivariate testing, including but not limited to the techniques described in the Multivariate Testing article of Wikipedia.org, and the various articles and references referred to therein.

In one embodiment, controller 108 itself operates based on various input parameters that are provided or derived from user input through an interface, such as the interface illustrated in FIG. 3. In addition to input parameters that specify the goal associated with a video asset, and the target control parameters whose values are to be determined by controller 108, the input parameters to controller 108 may include parameters that specify the structure of the experimentation groups used by controller 108. The parameters may indicate, for example, the respective ratios of how many people are to see an advertisement at the beginning of the video, in the middle of the video, at the end of the video, and how many are to see no advertisements at all.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
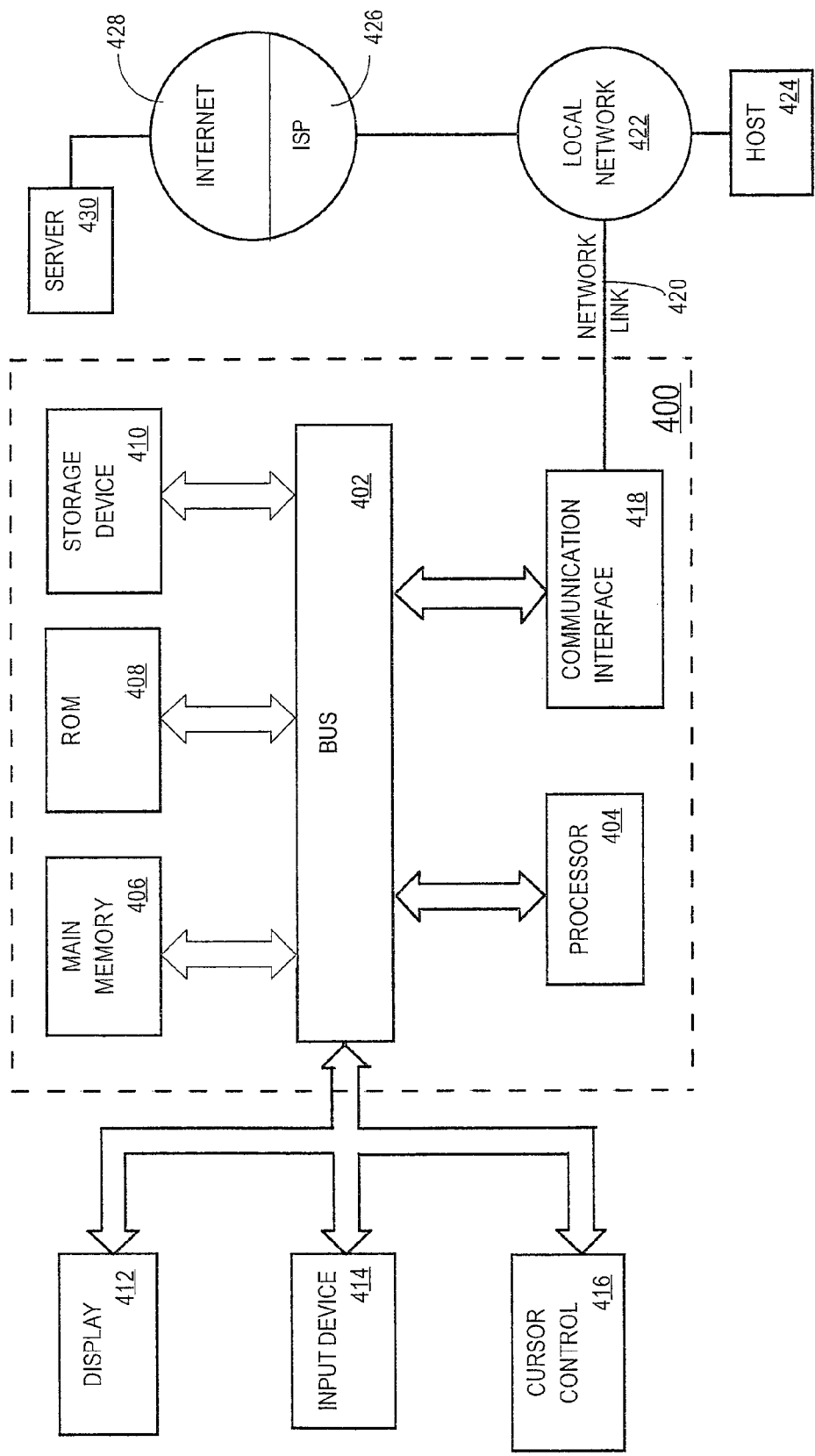
FIG. 4 is a block diagram of a computer system that may be used to implement embodiments of the invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
  a controller operatively connected within a feedback loop in which the controller:
    causes first playback units to play back a particular video asset in a manner dictated by one or more initial parameter values;
    wherein the one or more initial parameter values include a particular parameter value for at least one of:
      a time of day that the particular video asset may be delivered,
      a clustering of advertisements that are to be inserted into the particular video asset during playback of the particular video asset,
      a particular advertisement network that is to supply advertisements that will accompany the particular video asset,
      a mechanism by which users enter video recommendations or are presented with video recommendations,
      a keyword sent to an ad server that is serving advertising that will be associated with the particular video asset,
      a type of subscription that is required to allow playing the particular video asset, or
      a type of monetization strategy for the particular video asset;
      a location of a paywall within the particular video asset;
    receives usage information that reflects user actions, performed by multiple users while the particular video asset is presented to each of the multiple users in the manner dictated by the one or more initial parameter values;
    based, at least in part, on the usage information from the multiple users, automatically adjusts the one or more initial parameter values to produce one or more updated parameter values;
    wherein adjusting the one or more initial parameter values includes changing at least the particular parameter value;
    after adjusting the one or more initial parameter values to produce the one or more updated parameter values, causes second playback units to play back the particular video asset in a manner dictated by the one or more updated parameter values.

2. The system of claim 1 wherein the controller is configured to select the one or more initial parameter values to be used for playback of a given video asset based, at least in part, on current optimal parameter values determined for one or more video assets that have a similarity with the given video asset.

3. The system of claim 1 wherein the one or more initial parameter values that are controlled by the controller include a parameter value that affects layout of the first playback units.

4. The system of claim 1 wherein the controller selects the one or more initial parameter values for a video asset to be played by a particular user based, at least in part, on information about the particular user.

5. The system of claim 1 wherein the controller selects the one or more initial parameter values for a video asset to be played in a particular playback environment based, at least in part, on information about the particular playback environment.

6. The system of claim 1 wherein the one or more initial parameter values are selected by the controller based, at least in part, on usage results obtained by monitoring user actions while varying, from request to request, values for one or more target control parameters.

7. The system of claim 1 wherein the controller selects the one or more initial parameter values to optimize a goal metric.

8. The system of claim 7 further comprising a user interface that presents controls through which a user may specify a goal for the particular video asset or a particular set of video assets, wherein the goal metric that is optimized by the controller is based on the goal specified by the user through the user interface.

9. One or more non-transitory storage media storing instructions which, when executed by a controller that is operatively connected within a feedback loop, cause the controller to perform the steps of:

causing first playback units to play back a particular video asset in a manner dictated by one or more initial parameter values;

wherein the one or more initial parameter values include a particular parameter value for at least one of:

a time of day that the particular video asset may be delivered, a clustering of advertisements that are to be inserted into the particular video asset during playback of the particular video asset, a particular advertisement network that is to supply advertisements that will accompany the particular video asset, a mechanism by which users enter video recommendations or are presented with video recommendations, a keyword sent to an ad server that is serving advertising that will be associated with the particular video asset, a type of subscription that is required to allow playing the particular video asset, or a type of monetization strategy for the particular video asset;

a location of a paywall within the particular video asset;

receiving usage information that reflects user actions, performed by multiple users while the particular video asset is presented to each of the multiple users in the manner dictated by the one or more initial parameter values;

based, at least in part, on the usage information from the multiple users, automatically adjusting the one or more initial parameter values to produce one or more updated parameter values;

wherein adjusting the one or more initial parameter values includes changing at least the particular parameter value;

after adjusting the one or more initial parameter values to produce the one or more updated parameter values, causing second playback units to play back the particular video asset in a manner dictated by the one or more updated parameter values.

10. The system of claim 1, wherein the particular video asset is one of a plurality of video assets for which parameter values are maintained on a per-video-asset basis.

11. The system of claim 1, wherein the particular parameter value that is adjusted based on the usage information is for at least one of:

a clustering of advertisements that are to be inserted into the particular video asset during playback of the particular video asset.

12. The system of claim 1, wherein one of the one or more initial parameter values that is adjusted based on the usage information is for a type of advertisement to use with the particular video asset.

13. The system of claim 1, wherein the particular parameter value that is adjusted based on the usage information is for a particular advertisement network that is to supply advertisements that will accompany the particular video asset.

14. The system of claim 1, wherein the particular parameter value that is adjusted based on the usage information is for a time of day that the particular video asset may be delivered.

15. The system of claim 1, wherein one of the one or more initial parameter values that is adjusted based on the usage information is for a location of advertisement sets to use with the particular video asset, wherein the location is one of pre-roll, mid-roll, or post-roll with respect to playback of the particular video asset.

16. The system of claim 1, wherein the particular parameter value that is adjusted based on the usage information is for a mechanism by which users enter video recommendations or are presented with video recommendations.

17. The system of claim 1, wherein the particular parameter value that is adjusted based on the usage information is for a keyword sent to an ad server that is serving advertising that will be associated with the particular video asset.

18. The system of claim 1, wherein the particular parameter value that is adjusted based on the usage information is for a type of subscription that is required to allow playing the particular video asset.

19. The system of claim 1, wherein:

the particular parameter value that is adjusted based on the usage information is for a type of monetization strategy for the particular video asset;

the particular parameter value for the type of monetization strategy for the particular video asset is one of advertising, paywall, or subscription;

the changed particular parameter value is another one of advertising, paywall, or subscription.

20. The system of claim 1, wherein the particular parameter value that is adjusted based on the usage information is for a location of a paywall within the particular video asset.

21. The one or more non-transitory storage media of claim 9, wherein the controller further performs the step of selecting the one or more initial parameter values to be used for playback of a given video asset based, at least in part, on current optimal parameter values determined for one or more video assets that have a similarity with the given video asset.

22. The one or more non-transitory storage media of claim 9, wherein the one or more initial parameter values that are controlled by the controller include a parameter value that affects layout of the first playback units.

23. The one or more non-transitory storage media of claim 9, wherein the controller further performs the step of selecting the one or more initial parameter values for a video asset to be played by a particular user based, at least in part, on information about the particular user.

24. The one or more non-transitory storage media of claim 9, wherein the controller further performs the step of selecting the one or more initial parameter values for a video asset to be played in a particular playback environment based, at least in part, on information about the particular playback environment.

25. The one or more non-transitory storage media of claim 9, wherein the one or more initial parameter values are selected by the controller based, at least in part, on usage results obtained by monitoring user actions while varying, from request to request, values for one or more target control parameters.

26. The one or more non-transitory storage media of claim 9, wherein the controller further performs the step of selecting the one or more initial parameter values to optimize a goal metric.

27. The one or more non-transitory storage media of claim 26, wherein a user interface presents controls through which a user may specify a goal for the particular video asset or the particular set of video assets, wherein the goal metric that is optimized by the controller is based on the goal specified by the user through the user interface.

28. The one or more non-transitory storage media of claim 9, wherein the particular video asset is one of a plurality of video assets for which parameter values are maintained on a per-video-asset basis.

29. The one or more non-transitory storage media of claim 9, wherein the particular parameter value that is adjusted based on the usage information is for at least one of:
- a clustering of advertisements that are to be inserted into the particular video asset during playback of the particular video asset.

30. The one or more non-transitory storage media of claim 9, wherein one of the one or more initial parameter values that is adjusted based on the usage information is for a type of advertisement to use with the particular video asset.

31. The one or more non-transitory storage media of claim 9, wherein the particular parameter value that is adjusted based on the usage information is for a particular advertisement network that is to supply advertisements that will accompany the particular video asset.

32. The one or more non-transitory storage media of claim 9, wherein the particular parameter value that is adjusted based on the usage information is for a time of day that the particular video asset may be delivered.

33. The one or more non-transitory storage media of claim 9, wherein one of the one or more initial parameter values that is adjusted based on the usage information is for a location of advertisement sets to use with the particular video asset, wherein the location is one of pre-roll, mid-roll, or post-roll with respect to playback of the particular video asset.

34. The one or more non-transitory storage media of claim 9, wherein the particular parameter value that is adjusted based on the usage information is for a mechanism by which users enter video recommendations or are presented with video recommendations.

35. The one or more non-transitory storage media of claim 9, wherein the particular parameter value that is adjusted based on the usage information is for a keyword sent to an ad server that is serving advertising that will be associated with the particular video asset.

36. The one or more non-transitory storage media of claim 9, wherein the particular parameter value that is adjusted based on the usage information is for a type of subscription that is required to allow playing the particular video asset.

37. The one or more non-transitory storage media of claim 9, wherein:
- the particular parameter value that is adjusted based on the usage information is for a type of monetization strategy for the particular video asset;
- the particular parameter value for the type of monetization strategy for the particular video asset is one of advertising, paywall, or subscription;
- the changed particular parameter value is another one of advertising, paywall, or subscription.

38. The one or more non-transitory storage media of claim 9, wherein the particular parameter value that is adjusted based on the usage information is for a location of a paywall within the particular video asset.

* * * * *